March 26, 1968  L. W. THOMPSON ET AL  3,375,474

MICROWAVE WAVEGUIDE TO COAX COUPLING SYSTEM

Filed Oct. 8, 1965

INVENTOR.
LEONARD W. THOMPSON
BILLIE W. PRESTON
BY Sheridan and Ross

ATTORNEYS

March 26, 1968  L. W. THOMPSON ETAL  3,375,474

MICROWAVE WAVEGUIDE TO COAX COUPLING SYSTEM

Filed Oct. 8, 1965

INVENTOR.
LEONARD W. THOMPSON
BILLIE W. PRESTON
BY

*Sheridan and Ross*

ATTORNEYS

March 26, 1968  L. W. THOMPSON ET AL  3,375,474
MICROWAVE WAVEGUIDE TO COAX COUPLING SYSTEM
Filed Oct. 8, 1965  3 Sheets-Sheet 3

INVENTOR.
LEONARD W. THOMPSON
BILLIE W. PRESTON
BY
Sheridan and Ross
ATTORNEYS

3,375,474
MICROWAVE WAVEGUIDE TO COAX COUPLING SYSTEM

Leonard W. Thompson, Golden, and Billie W. Preston, Littleton, Colo., assignors to Martin-Marietta Corporation, New York, N.Y., a corporation of Maryland
Filed Oct. 8, 1965, Ser. No. 494,189
15 Claims. (Cl. 333—21)

This invention lies in the field of guided electromagnetic wave transmission systems, and relates particularly to a system for directly coupling a circular hollow waveguide to a coaxial conductor transmission line in minimum space with a minimum of material and with optimum results.

In coupling a hollow waveguide to a coaxial line it is desirable to convert the wave form from one most suitable for propagation in the waveguide to a form suitable for transmission in the coaxial line. Conversely the wave in the coaxial line should be converted to a form suitable to the geometry of the waveguide. Many schemes for accomplishing this have been proposed and built in the past and usually have accomplished their basic purpose but most of them have involved undesirable bulk or complication or have resulted in inefficient transmission.

The present invention overcomes many of the difficulties encountered in the past and provides an extremely simple and compact system for coupling a circular waveguide to a coaxial conductor transmission line, the former carrying waves in the $TE_{01}$ mode and the latter carrying waves in the TEM mode. The transition works equally well in either direction with minimum losses and consequently maximum transmission. The coaxial line can be readily coupled to a rectangular waveguide so that transition from circular to rectangular guide or vice versa can be accomplished very readily.

Briefly, in its presently preferred form, the invention may be carried out by passing the free end of a coaxial line through the end wall of a circular waveguide, with the outer conductor in electrical contact with the end wall. The free end is located on the electrical center of the guide and projects a suitable distance beyond the end wall. A thin disk of non-conductive material is bonded at its rear face to the free end of the outer conductor in position to be coaxial therewith and to lie in a plane normal to the axis of the conductor and of the wave guide. The free end of the inner conductor passes through a small aperture in the disk and is connected electrically to a set of eight radiating elements. Each of these elements includes a feeder and an antenna. The feeders extend radially from the vicinity of the center line of the conductor and the waveguide and their outer ends are preferably at the margin of the disk and lie in a circle of a diameter substantially half of the inside diameter of the waveguide. They are equiangularly spaced and, since the disk is flat, they lie in a common plane normal to the center line or axis.

At the outer end of each feeder is connected an antenna. These antennas are slender and elongate and, in the preferred form, they lie along the margin of the disk with one end attached to the associated feeder and the other end extending toward the outer end of the next successive feeder. As is known, the maximum current in the $TE_{01}$ wave form is at a distance substantially half way between the axis and the inside wall of the circular waveguide. Thus it will be seen that the entire extent of each antenna is at the locus of the maximum current, which results in maximum transmission and reception. Each antenna has a length substantially equal to one half of the distance between the outer ends of adjacent or succeeding feeders.

In its preferred form, the end wall is provided with a central boss having a passage therethrough coaxial with the waveguide. The outer conductor of the coaxial line is a friction fit in the passageway, which establishes electrical contact with the end wall and the waveguide. Therefore the outer conductor may be moved axially to position the radiating system accurately for optimum coupling conditions. A set screw is provided in the boss to engage the outer conductor and lock it in the selected position and also to render the electrical contact more positive.

In another version of the invention, a balanced feeder system and dipole antenna elements are obtained on the thin disk of non-conductive material. This is achieved by providing similar feeder and antenna patterns on the front and rear faces of the disk wherein the radial feeders on one face are placed in register with corresponding feeders on the other face, and the antennas on one face extend in opposing directions to corresponding antennas on the other face.

The inner and outer conductors of the coaxial line are suitably connected to the radially inner ends of the feeders on the front and rear faces, respectively, of the disk. Since the outer conductor of the coaxial line is connected to an active section of the radiating system or probe structure, it is not necessary to establish electrical contact with the coaxial line mounting end wall of a waveguide as before. Thus, the coaxial line can be insulated from the supporting end wall of the waveguide to provide direct current isolation and prevent ground current flow in the system.

A good match between the impedance at the common centers of the feeders and the characteristic impedance of the coaxial line is further provided in this invention by the use of a suitably tapered coaxial line segment in the portion of the line immediately preceding its connection to the common centers of the feeders. Since the impedance of a coaxial line is dependent on the ratio of the diameters of the inner and outer conductors, the taper may be incorporated in either or both of these conductors.

An added feature of this waveguide system is derived from the current distribution of the $TE_{01}$ mode in a circular waveguide. The electric field lines in the $TE_{01}$ mode in a transverse plane perpendicular to the axis of the waveguide are concentric about this axis and vary radially from zero to a midway maximum and back to zero at the walls of the waveguide. Thus, the current at the axis and the walls of the waveguide would be effectively zero in a conductor at these points.

In view of this, one or more small openings are preferably provided in the waveguide end wall immediately adjacent to either the coaxial line or the juncture of the waveguide and its end wall, or both places, for the purpose of introducing a pressurizing gas or for measuring the internal pressure in a pressurized waveguide. These small openings communicate with a pressure fitting which is attached to the end wall to take advantage of its thicker structure. If the coaxial line is a pressurized type of line, one or more small openings can be provided through its outer conductor to permit pressurization of both the coaxial line and the waveguide by a common source of pressurization.

Various other advantages and features of novelty will become apparent as the description proceeds in conjunction with the accompanying drawing, in which.

Figure 1:
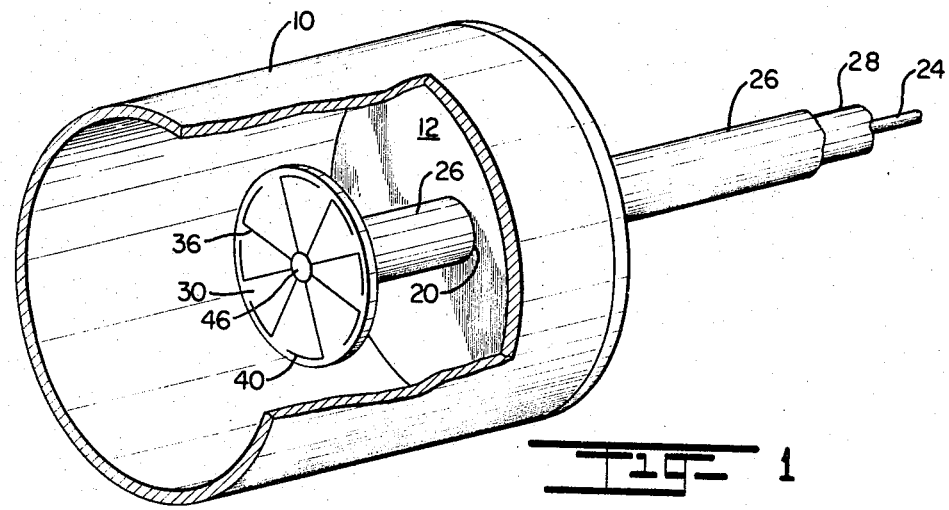
FIGURE 1 is a perspective view of the coupling system with the waveguide broken away to show the radiating system and its location.
Figure 2:
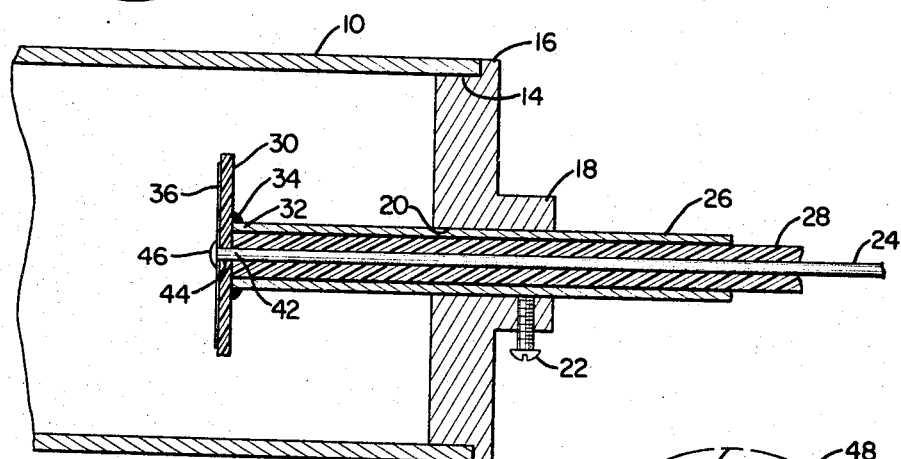
FIGURE 2 is a longitudinal sectional view in elevation showing the relation of the various elements.

One preferred form of the invention is illustrated in FIGURES 1 and 2 in which the coupling system comprises a waveguide 10 provided with an end wall 12. The latter is formed with a reduced annular section 14 fitting snugly within the end of the waveguide, and shoulder 16 abutting the end of the guide to align the end wall at a right angle to the guide. On its outer face the end wall is provided with a cylindrical boss 18, and a passageway 20, coaxial with the waveguide, extends through the total thickness of the end wall. A set screw 22 extends radially through the boss to clamp the coaxial conductor transmission line.

The latter consists of an inner conductor 24, preferably a solid rod or wire, an outer tubular conductor 26 coaxial with and surrounding the inner conductor, and suitable insulating material 28 therebetween. Conductor 26 is a friction fit in passage 20 so that it can be adjusted axially and still be held rather firmly in any selected position. Since end wall 12 is metallic, it serves to connect conductor 26 electrically to waveguide 10. The set screw further assists in locking the conductor in the desired position and also insures satisfactory electrical contact.

The radiating system or probe includes a thin sheet 30 of non-conductive material which is preferably in the form of a disk and is secured coaxially, at its rear face to the forward free end 32 of the outer conductor by any suitable bonding means such as cement 34. In this position it lies in a plane normal to the axis of the waveguide. For reasons to be pointed out, the diameter of the disk is substantially one half of the inside diameter of the waveguide.

Figure 3:
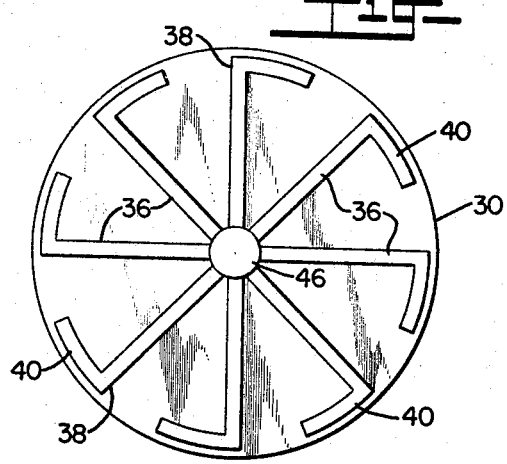
FIGURE 3 is a front elevational view of the radiating system or probe.

As best seen in FIGURE 3, the radiating elements comprise a plurality of feeders and antennas. The feeders 36 are slender, elongate conductive elements extending radially from the center line of the inner conductor and the waveguide and are equiangularly spaced as shown. Their outer ends 38 lie in a circle which is coincident with the periphery of disk 30, and hence their length is substantially one quarter of the inside diameter of the waveguide.

An antenna 40 is provided for each feeder and, in its preferred form, is a slender, elongate, conductive element secured at one end to the outer end 38 of its associated feeder, with its other end extending toward the outer end of the adjacent, succeeding feeder. The antenna may be straight but is preferably curved as shown to lie along the circle constituting the margin of disk 30. It may be integral with its associated feeder or secured thereto by any suitable conductive bonding material. The antennas and feeders may be punched out of metal foil or formed of bent wires. However, they are extremely small and delicate and it is preferred to form them directly on the disk as a base by conventional printed circuit techniques. Hence the disk is made just the size of the circle encompassing the radiating elements. If the elements were made of wire, the sheet 30 could be much smaller and would not necessarily be circular, and the elements would be self supporting, but the arrangement shown is preferred.

The inner ends of feeders 36 are electrically connected to the free end 42 of inner conductor 24, which extends through aperture 44 in sheet 30, by any suitable means such as a spot of solder 46. In the case of self supporting wires, conductor 24 would serve as the supporting base. However, the arrangement shown is desirable for various reasons, including the fact that sheet 30 serves to insure electrical separation of the feeders from outer conductor 26.

Figure 4:
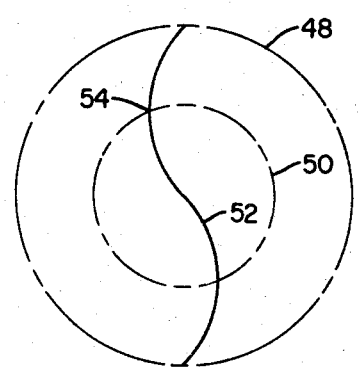
FIGURE 4 is a schematic view indicating the relation of the current to the waveguide and the relation of the antennas to the current.

Turning now to FIGURE 4, the outer circle 48 in phantom lines represents the inner diameter of the waveguide and the inner circle 50 in phantom lines represents the circle including antennas 40 and outer ends 38 of feeders 36 and, of course, the margin of disk 30. The solid sine wave line 52 across the diameter of the waveguide represents the intensity of the current, which is substantially zero at the center line and at the walls, and a maximum at point 54, which is approximately halfway between the center line and the walls. The length of feeders 36 has been made one fourth of the diameter or one half of the radius so that the antennas 40 will be at the locus of the maximum intensity of the current. Therefore, losses are held to a minimum and transmission is a maximum whether the antennas are serving as receivers or as transmitters.

Experience has shown that the best results are obtained when eight radiating elements are used, the lengths of the feeders are as described above, and the antennas span one half the distance between the outer ends of successive feeders, their length being one sixteenth of the circumference of circle 50. These numbers and dimensions are particularly important in maintaining $TE_{01}$ propagation through the circular waveguide.

It will be seen that the coupling system described above is extremely simple and compact, requiring very little more than the coaxial line and the waveguide themselves, yet it performs the functions of much bulkier and more complex devices. For example, in a three inch waveguide, the radiating system itself is about one sixteenth inch thick and one and one half inches in diameter. The total amount of the device which may be considered as the coupling system is about three inches long and has replaced systems which are from one and one half to three feet long.

In addition it serves as an equally compact and simple transition between circular and rectangular waveguides because the inner conductor 24 can be inserted directly into a rectangular waveguide to act as a probe.

Figures 5, 6, 7:
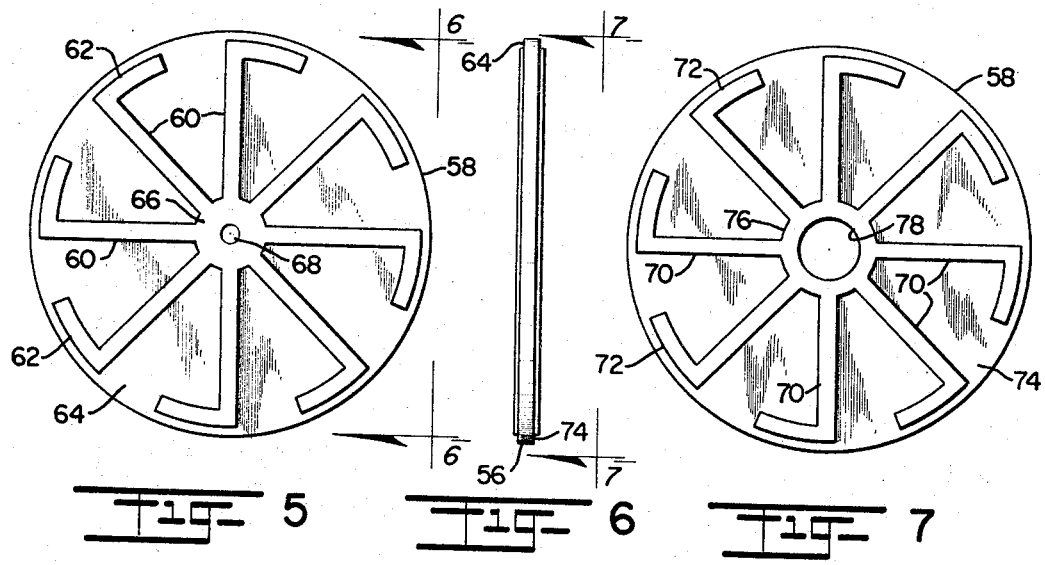
FIGURE 5 is a front elevational view of a radiating system or probe structure which includes a balanced feeder system and associated dipole antenna elements.
FIGURE 6 is a bottom plan view of the structure shown in FIGURE 5 as taken along the line 6—6 indicated therein.
FIGURE 7 is a rear elevational view of the structure shown in FIGURE 5, as taken along the line 7—7 indicated in FIGURE 6.

A balanced feeder system and dipole antenna elements are obtained with the radiating system or probe structure shown in FIGURES 5, 6 and 7. The front elevational view of FIGURE 5 is similar to that of FIGURE 3. A thin sheet 56 of non-conductive material is preferably provided in the form of a disk 58. As illustrated, a plurality of feeders 60 and antennas 62, similar to the feeders 36 and antennas 40 of FIGURE 3, are provided on the front face 64 of the disk 58. The feeders 60 extend radially from a central hub 66 having a circular aperture 68 therein, and are equiangularly spaced as shown.

A similar pattern of feeders 70 and antennas 72 are provided on the rear face 74 of the disk 58 as indicated in FIGURE 7. The feeders 70 are held in register with corresponding feeders 60 but the antenna 72 extend in directions respectively opposing that of their corresponding antennas 62, as can be seen in FIGURE 7. The feeders 70 extend radially from a central hub 76 having a circular aperture 78 therein, and are equiangularly spaced as shown. The aperture 78 preferably has a larger diameter than the aperture 68. Thus, it is apparent that the feeder system is composed of parallel pairs of conductors which are separated by the dielectric material of the supporting disk 58 and these pairs of conductors are terminated by respective dipole antenna elements.

The characteristic impedance of the feeders is essentially determined by the width of the thin conductors (feeders 60 and 70), the thickness of the dielectric material (sheet 56) and the electrical properties of the material. The impedance at the center of the structure is equal to the characteristic impedance of each feeder pair divided by the number of feeder pairs. Each pair of feeders is, of course, constructed to provide a characteristic impedance which will produce a good match to its corresponding dipole antenna element.

Figure 8:
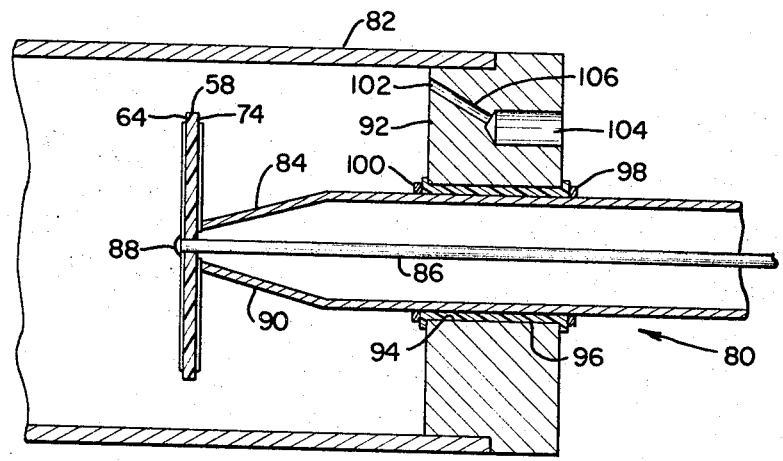
FIGURE 8 is a longitudinal sectional view, in elevation, showing the structure of FIGURES 5, 6, and 7 mounted in a waveguide.

The structure shown in FIGURES 5, 6 and 7 is preferably connected to a coaxial line 80 and mounted in a waveguide 82 as shown in FIGURE 8. In order to obtain a good match between the impedance at the center of the structure and the characteristic impedance of the coaxial line 80, a tapered coaxial line segment 84 is preferably provided in the portion of the coaxial line 80 immediately preceding its connection to the common center hubs 66 and 76 of the feeders 60 and 70, respectively. The inner conductor 86 is passed through disk 58 and is solid and uniform in diameter, and is suitably connected to the hub 66 at point 88 as shown. The outer, tubular conductor 90, however, radially tapers inwardly and is suitably connected at its end to the hub 76. This gradual change in dimension of the outer conductor 90 only, produces a gradual change in characteristic impedance of the coaxial line 80 so that virtually no reflected waves would be generated by the change.

The waveguide 82 is provided with a relatively thicker end wall 92 which is suitably secured to the waveguide 82 as shown in FIGURE 8. The end wall 92 is provided with a passageway 94 which is coaxial with the axis of the waveguide 82. The coaxial line 80 is journaled in a bearing 96 which can be made of a suitable insulating material, if desired, to provide direct current isolation which is often required to prevent ground current flow in complex systems. Seals 98 and 100 are provided at the ends of the bearing 96, and are constructed to permit axial movement of the coaxial line 80. Thus, the position of the disk 58 and the dipole antenna elements thereon can be adjusted with respect to the end wall 92 to allow tuning for optimum operation. The distance of the plane of the thin disk 58 from the end wall 92 is, of course, nominally one quarter wavelength at the optimum point.

It is noted that the outer conductor of the coaxial line 80 is connected to an active portion of the radiating system or probe structure including the balanced feeder system and dipole antenna elements. The necessity of providing an electrical connection between the outer conductor of the co-axial line 80 and the end wall 92 of the waveguide 82 is thus obviated, and an insulator such as the bearing 96 can be used to provide direct current isolation if desired for any particular installation.

Waveguide systems are commonly pressurized to maintain a constant pressure inside a sealed system and to prevent entrance of moisture and other contaminants. Decrease in the air pressure inside a pressurized component of a waveguide system decreases the maximum power that the component will handle without voltage breakdown. Moisture and other contaminants therein cause an increase in the losses of the component and, of course, corrosion of the metallic parts thereof.

The current distribution of the $TE_{01}$ mode in a circular waveguide as the waveguide 82 is such that the current is effectively zero at the walls and axis of the waveguide. A small opening 102 is, therefore, preferably provided immediately adjacent the juncture of the waveguide 82 and the end wall 92 for the purpose of introducing a pressurizing gas or for measuring the internal pressure in the waveguide. The opening 102 is connected to a tapped opening 104 through a passageway 106 as shown in FIGURE 8. More than one opening with a connecting passageway can, of course, be provided at other points immediately adjacent the juncture about the waveguide. A pressure fitting (not shown) is normally attached to the tapped opening 104 which is located in the end wall 92 to take advantage of the thicker material.

Figure 9:
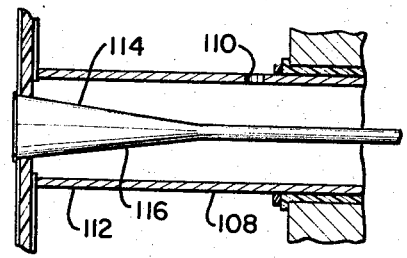
FIGURE 9 is a fragmentary view illustrating a variation of an impedance matching coaxial line segment which is provided in the portion of the line immediately connected to the radiating system or probe structure.

Alternatively, the pressure line opening may be located immediately adjacent to the coaxial line 80 or, in the event that a pressurized type of coaxial line 108 is used as indicated in the fragmentary view of FIGURE 9, one or more openings, such as the small opening 110 through the outer conductor 112 of the coaxial line 108, can be provided so that a common source (not shown) of pressurization could be utilized to pressurize the coaxial line and its associated waveguide.

It was previously mentioned that the impedance of a coaxial line is dependent upon the ratio of the diameters of its inner and outer conductors. In FIGURE 8, a convergent taper was provided in the outer conductor 90 over the line segment 84 in order to match the characteristic impedance of the coaxial line 80 to the impedance at the center of the radiating system or probe structure. A taper, however, may be incorporated in either the inner or outer conductors, or both of them to accomplish this.

An alternate matching section is, for example, shown in FIGURE 9 wherein a tapered coaxial line segment 114 includes a constant diameter, tubular outer conductor 112 and a divergently tapered inner conductor 116. The inner conductor 116 connects with a common center hub corresponding to the hub 66 on the front face 64 of the disk 58 shown in FIGURE 5. Similarly, the outer conductor 112 connects with a common center hub corresponding to the hub 76 on the rear face 74 of the disk 58 as shown in FIGURE 7.

Figure 10:
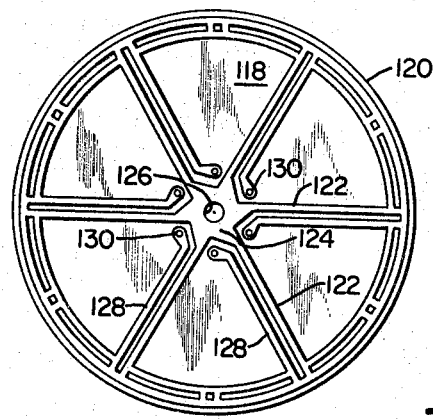
FIGURE 10 is a front elevational view of a radiating system or probe structure which includes a balanced feeder system and a basic antenna pattern on one side only of a support disk.

A variation of the radiating system or probe structure shown in FIGURES 5, 6 and 7 is obtained by establishing a more complex pattern on one face only of the support disk. A basic pattern (strapped) which is provided on, for example, the front face 118 of a thin, dielectric disk 120 is shown in FIGURE 10. A set of feeders 122 extend radially from a central hub 124 having a circular aperture 126 therein, and are equiangularly spaced about the front face of the disk 120 as illustrated. Another set of feeders 128 are positioned radially parallel respectively with the feeders 122 at a predetermined spacing therefrom. The radially inner ends of the feeders 128 are, however, terminated with respective apertures 130 having centers which are located on a circle concentric with the center of the disk 120.

The characteristic impedance of the pairs of feeders 122 and 128 is controlled by the width and spacing of the conductors, and by the dielectric properties of the support disk 120. A basic antenna pattern is shown connected to the pairs of feeders 122 and 128 in FIGURE 10. Here, a proper variation of the basic pattern can be made to derive a wide variety of antenna types.

Figure 11A:
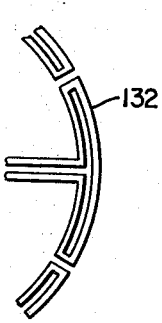
FIGURES 11A, 11B, 11C, 11D and 11E are fragmentary views which illustrate representative types of different dipole antenna elements that have been derived from the basic antenna pattern.
Figure 11B:
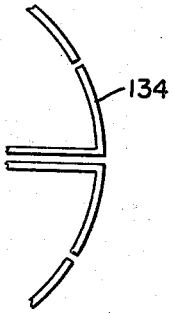
Figure 11C:
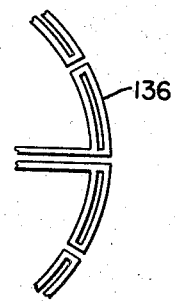
Figure 11D:
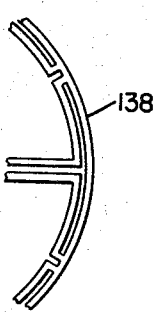
Figure 11E:
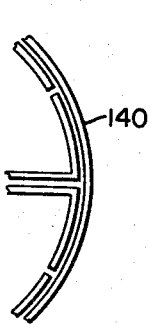

Representative antenna types with their feeders located on one side only of a support disk are, for example, illustrated in the fragmentary views of FIGURES 11A, 11B, 11C, 11D and 11E. In FIGURE 11A, a folded dipole 132 antenna system is indicated; a half wave dipole 134 antenna system is shown in FIGURE 11B; and a modification 136 of the half wave dipole antenna system is illustrated in FIGURE 11C. FIGURE 11D shows an antenna system which includes delta matched dipoles 138, and FIGURE 11E shows an antenna system which includes T matched dipoles 140.

Of course, other antenna types may be employed which are variations of the types shown in FIGURES 11A through 11E. The primary requirement, however, is to provide an integral number of a dipole element around the periphery of the support disk 120 wherein the antennas will be at the locus of maximum intensity or amplitude of the current or the electric field. This will provide substantially optimum coupling to the $TE_{01}$ mode in a circular waveguide. As before, energy flow from a coaxial line to the waveguide through the coupling system is equally efficient in the reverse direction since this is a fully reciprocal system.

Figure 12:
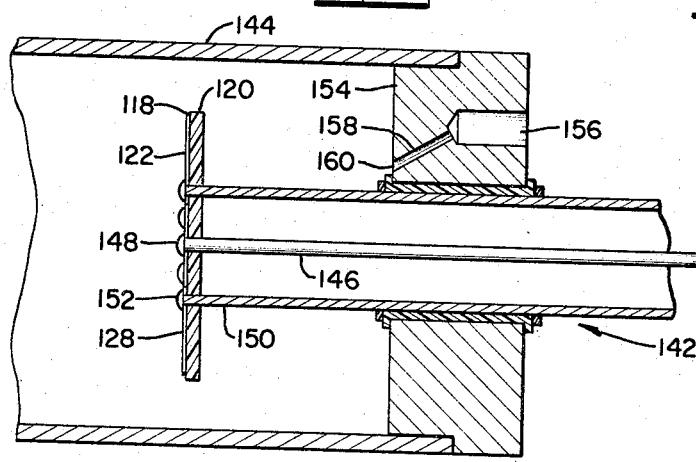
FIGURE 12 is a longitudinal sectional view, in elevation, showing the structure of FIGURE 10 mounted in a waveguide.

The disk 120 is shown mounted and connected to a coaxial line 142 in a waveguide 144 in FIGURE 12. The inner conductor 146 of the coaxial line 142 is passed through disk 120 and aperture 126 to connect electrically with the hub 124 at point 148. The end of the outer, tubular conductor 150 is, for example, appropriately shaped to pass through the disk 120 and the apertures 130 to connect electrically with the radially inner ends of the feeders 128 at points such as the point 152.

The waveguide 144 is similar to the waveguide 82 which is shown in FIGURE 8. It can be seen from FIGURE 12 that the coaxial line 142 is mounted in end wall 154 of the waveguide 144 in a manner similar to the coaxial line 80 in the end wall 92 of the waveguide 82. The axis of the coaxial line 142 is coincident with the axis of the waveguide 144 and the plane of the disk 120 is normal to the axis of the waveguide 144 as was the plane of the disk 58 normal to the axis of its waveguide 82.

The end wall 154 of the waveguide 144 also has a tapped opening 156 to which can be connected a pressure fitting (not shown). A passageway 158 connects the tapped opening 156 with a small opening 160 located immediately adjacent to the coaxial line 142. As was mentioned previously, such an opening 160 is provided for the purpose of introducing a pressurizing gas or for measuring the internal pressure in the waveguide.

Other openings such as the opening 160 can be provided about the coaxial line 142 immediately adjacent thereto, if desired. Also, a combination of openings such as the opening 102 (FIGURE 8) and opening 160 can be employed with suitable connecting pressure passageways. If the coaxial line is a pressurized line, opening 110 (FIGURE 9) can be used in lieu of the opening 160 in the aforementioned combination of openings.

It will be apparent to those skilled in the art that various changes and modifications may be made in the construction as illustrated and described without departing from the spirit of the invention, and it is intended that all such changes and modifications shall be embraced within the scope of the following claims.

We claim:

1. In a microwave transmission system, a hollow circular waveguide having an end wall closing one end thereof, a coaxial transmission line having an inner conductor and an outer conductor surrounding said inner conductor, said transmission line terminates within said waveguide with the end portion of said inner conductor extending along the central longitudinal axis of said waveguide, and means for coupling said transmission line and said waveguide and operable to propagate $TE_{01}$ mode wave along said waveguide including feeder means comprising a plurality of feeder elements electrically connected to said end portion of said inner conductor and extending radially therefrom in a plane normal to said longitudinal axis of said waveguide and antenna means electrically connected to the outer ends of said feeder elements and arranged in said plane such that the longitudinal axis thereof lies on the circumference of a circle in which said feeder elements are radii.

2. In a microwave system as defined in claim 1, said antenna means comprises a plurality of spaced arcuate-shaped antenna elements, each of said antenna elements being electrically connected at one end to said outer end of one of said feeder elements and having a length along the circumference of said circle approximately one-half of the arcuate distance between said outer ends of adjacent feeder elements.

3. In a microwave transmission system as defined in claim 2, said means for coupling said waveguide and said coaxial transmission line further includes eight of said feeder elements equiangularly spaced from each other and eight of said antenna elements, each of said antenna elements having a length equal to one sixteenth of the circumference of said circle and extending in the same arcuate direction away from its feeder element.

4. In a microwave transmission system as defined in claim 1, each of said feeder elements having a length equal to one quarter of the inside diameter of said waveguide.

5. In a microwave transmission system as defined in claim 1, said feeder means includes a plurality of pairs of feeder elements, one of said feeder elements of each of said pairs of feeder elements being electrically connected to said inner conductor and the other feeder element of said pair being electrically connected to said outer conductor, and said antenna means comprising a plurality of dipole antenna elements connected to the outer ends of said pairs of feeder elements.

6. A system as claimed in claim 5; said coaxial line being insulatedly mounted in said end wall whereby direct current isolation between said coaxial line and said end wall is obtained.

7. A system as claimed in claim 5; said coaxial line including a tapered line segment provided in the portion of said line immediately preceding its connection to the radially inner ends of said pairs of feeders whereby a match of impedances is obtained.

8. A system as claimed in claim 5; including a thin sheet of non-conductive material secured to the inner end of said coaxial line and extending in a plane normal to the axis of said waveguide, and having said pairs of feeders and connected dipole antenna elements located on at least one face of said sheet.

9. A system as claimed in claim 5; including a thin sheet of non-conductive material secured to the inner end of said coaxial line and extending in a plane normal to the axis of said waveguide, and having said pairs of feeders and connected dipole antenna elements symmetrically divided and located on respective front and rear faces of said sheet.

10. A system as claimed in claim 5; including an opening in said end wall located at a point of substantially zero current in said waveguide, and a passageway connecting said opening to a pressurization means.

11. A system as claimed in claim 5; said coaxial line being a pressurized line and including an opening in said outer conductor communicating with the interior of said waveguide whereby a common source of pressurization can be used for pressurizing said coaxial line and said waveguide.

12. A system as claimed in claim 5; said coaxial line being mounted in said end wall to permit axial adjustment thereof whereby said means for coupling can be positioned a predetermined distance from said end wall to tune said waveguide system for optimum operation.

13. Radiating means for a coupling a circular waveguide and a coaxial conductor transmission line and operable to propagate $TE_{01}$, mode waves through the waveguide comprising: a thin sheet of non-conductive material; a set of eight feeders located on one face of said sheet and extending radially outward in a common plane from a central point, and being equiangularly spaced; the outer ends of said feeders lying in a circle of a diameter substantially one half the inside diameter of a waveguide with which the radiating means is to be used; and an antenna on the outer end of each feeder; each antenna being slender and elongate and extending in said plane of said feeders and lying along the circumference of said circle; the length of each antenna being substantially one half of the distance between the outer ends of successive feeders; said feeders being adapted to be electrically connected to the inner conductor of a coaxial conductor transmission line.

14. Radiating means as claimed in claim 13; said sheet being in the form of a disk having an outer margin substantially coincident with the outer ends of said feeders and with said antennas.

15. Radiating means as claimed in claim 14; said feeders and antennas being in the form of printed circuit deposits formed directly on the face of said disk.

References Cited

UNITED STATES PATENTS

| | | |
|---|---|---|
| 2,489,131 | 11/1949 | Hegbar. |
| 2,783,440 | 2/1957 | Lovick. |
| 2,860,311 | 11/1958 | Balian. |
| 3,109,151 | 10/1963 | Saad et al. _____ 333—21 |
| 3,114,123 | 12/1963 | Kreuchen et al. |
| 3,121,850 | 2/1964 | Arlt _____ 333—21 |

FOREIGN PATENTS 781,672   8/1957   Great Britain.

HERMAN KARL SAALBACH, *Primary Examiner.*

ELI LIEBERMAN, *Examiner.*

L. ALLAHUT, *Assistant Examiner.*